United States Patent [19]

Golben

[11] Patent Number: 4,687,049

[45] Date of Patent: Aug. 18, 1987

[54] THERMALLY REVERSIBLE HEAT EXCHANGE UNIT AND METHOD OF USING SAME

[75] Inventor: Peter M. Golben, Wyckoff, N.J.

[73] Assignee: Ergenics, Inc., Wyckoff, N.J.

[21] Appl. No.: 930,675

[22] Filed: Nov. 14, 1986

Related U.S. Application Data

[63] Continuation of Ser. No. 377,556, May 12, 1982, abandoned.

[51] Int. Cl.⁴ ............................................. F28D 21/00
[52] U.S. Cl. ................................... 165/1; 165/104.12; 62/48
[58] Field of Search ...................... 165/104.12, 154, 1; 62/48

[56] References Cited

U.S. PATENT DOCUMENTS

| 4,372,376 | 2/1983 | Nelson et al. | 165/104.12 |
| 4,396,114 | 8/1983 | Golben et al. | 165/104.12 |

FOREIGN PATENT DOCUMENTS

| 68448 | 6/1978 | Japan | 165/104.12 |
| 65589 | 4/1982 | Japan | 165/104.12 |

Primary Examiner—Albert W. Davis, Jr.
Attorney, Agent, or Firm—Charles E. Baxley

[57] ABSTRACT

A thermally reversible heat exchange unit and method of use comprising an elongated outer jacket, at least one interior heat transfer surface and heat exchange fluid flowing therebetween in plug fashion.

12 Claims, 3 Drawing Figures

THERMALLY REVERSIBLE HEAT EXCHANGE UNIT AND METHOD OF USING SAME

This is a continuation of application Ser. No. 377,556, filed May 12, 1982, and now abandoned.

The present invention is concerned with a heat exchange unit and more particularly with a thermally alternating heat exchange unit.

Thermally alternating heat exchange units are required for use in absorption-desorption systems wherein absorption from a gas phase occurs at a heat sink temperature and desorption occurs at a higher heat source temperature. For efficiency in such systems, it is necessary that good heat transfer be accompanied by rapid thermal reversal. In particular with hydride systems such as refrigerators, heat pumps, compressors and hydrogen storage devices wherein hydrogen is chemically combined with an intermetallic compound such as FeTi or an $AB_5$ compound where A is principally calcium or a rare earth metal and B is principally nickel or cobalt, there is a substantial need for rapidly reversible heat exchange units which can withdraw heat from and provide heat to hydride and hydridable alloy using heat sinks and heat sources of moderate temperature, e.g. 300° K. for heat sink and 325° K. to 380° K. for heat sources.

It is the object of the present inventon to provide a novel thermally reversible heat exchange unit.

Another object of the invention is to provide a novel thermally reversible heat exchange unit incorporating a hydride container or containers of enhanced thermal conductivity and hydrogen accessibility.

Other objects and advantages will become apparent from the following description taken in conjunction with the drawing in which.

Generally speaking, the present invention contemplates a thermally alternating heat exchange unit which comprises an elongated jacket and at least one elongated heat transfer surface inside the jacket positioned essentially parallel to the longitudinal axis of the jacket. The jacket contains a heat exchange liquid adapted to flow between the wall of the jacket and the heat transfer surface under a head adapted to provide plug flow of the liquid through the jacket.

Specifically the jacket may be a straight tube or the tube may be coiled, meandered or otherwise shaped to fit in an available volume. Plug flow of liquid means flow in such a manner that when a liquid of one temperature is flowing through the jacket and then flow is changed by external valving to provide flow of a miscible liquid of different temperature, there is little or no mixing of the liquids in the jacket and when the plug of the first liquid exits the jacket the exit port will experience a sharp temperature demarkation rather than a gradual temperature change.

Figure 1:
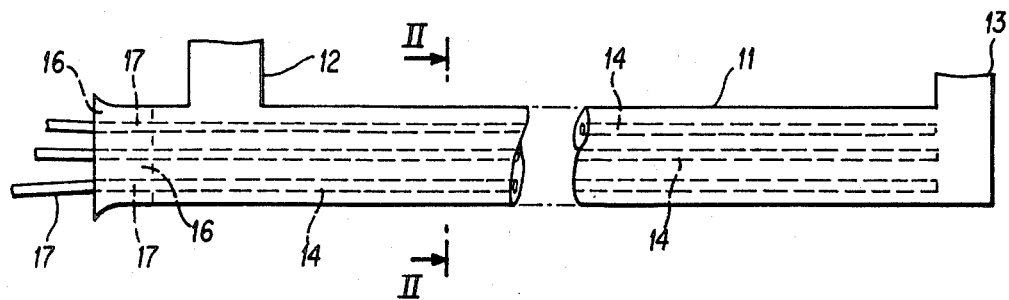
FIG. 1 is a longitudinal view in phantom of a heat exchange unit of the present invention.

A heat exchange unit of the present invention is illustrated in the drawing. Referring now thereto and particularly to FIGS. 1 and 2, elongated jacket 11 comprising a tube of any material, e.g. metal or plastic capable of holding flowing heat transfer liquid e.g. water at moderate temperature is provided with inlet 12 and outlet 13.

Figure 2:
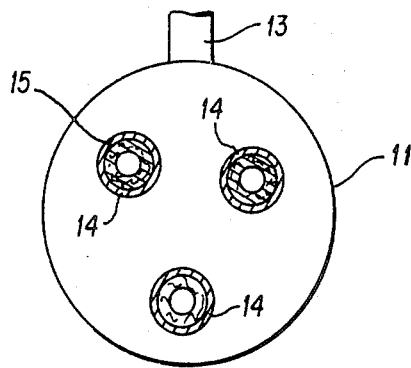
FIG. 2 is a cross-sectional view of the heat exchange unit of FIG. 1 at the section II—II and FIG. 3 is an enlarged cross-sectional view of a hydride container shown in FIG. 2.
Figure 3:
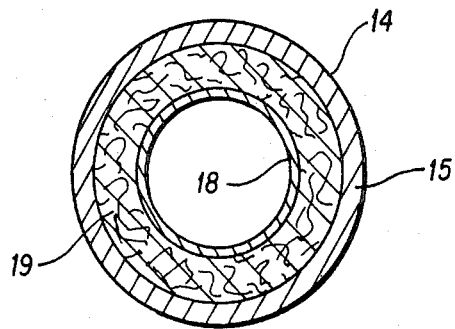

Within jacket 11 are three (as illustrated but may be more or less) close-ended hydride containers 14 the walls 15 of which comprise heat transfer surfaces. These walls are depicted in FIGS. 2 and 3 as being of metal i.e. a hydrogen resistant metal such as copper or stainless steel. Containers 14 are enclosed in jacket 11 by any convenient means 16 and may as illustrated by provided with inlet tubes 17 of reduced diameter to facilitate leak-proof sealing in jacket 11. A most advantageous design of hydride containers 14 is depicted in FIG. 3 which shows metal wall 15, an essentially coaxial coiled spring means 18 defining a central hydrogen gas space and confining hydridable material 19 between spring means 18 and wall 15. This design is the subject of a prior Golben et al. U.S. Pat. No. 4,396,114, issued Aug. 2, 1983 and assigned to the assignee hereof.

In a particular operation, the thermally reversible heat exchange unit of the present invention comprises a jacket about 300 cm long and about 2.9 cm in outside diameter. When fed with water at a rate of about 8 liters per minute, plug flow occurs and it takes about 7 to 8 seconds for water of one temperature to displace water of another temperature in jacket 11 without substantial mixing of the waters.

As used herein, "effective inside diameter" of the jacket means the diameter of a circle having the area equal to the cross-sectional area of the inside of the jacket which is occupiable by heat exchange liquid and "effective area" of the jacket means the area of such a circle.

In the operation described above, the inside diameter of jacket 11 is less than 2.9 cm, because that is the outside diameter of jacket 11. Therefore, the ratio of the length of jacket 11 to its inside diameter is substantially greater than 100 to 1. Also, from the fact that the flow rate is about 8 liters per minute (0.133 liter per second) and from the further fact that it takes 7 to 8 seconds for heat exchange liquid of one temperature to displace heat exchange liquid of another temperature, it follows that the volume inside jacket 11 that is occupiable by heat exchange liquid is between about 0.931 liter ($7 \times 0.133$) and about 1.064 liters ($8 \times 0.133$), or between 56.8 cubic inches and 64.9 cubic inches, 61.025 cubic inches being equivalent to 1 liter. For a volume of 56.8 cubic inches and a length of 300 cm or 118.1 inches, the effective area of jacket 11 is 0.481 square inch (3.10 cm$^2$) and the effectiveness inside diameter is 0.783 inch and the ratio of jacket length to effective inside diameter is about 151 to 1. For a volume of 64.9 cubic inches and a length of 118.1 inches, the effective area of jacket 11 is 0.550 square inches (3.54 cm$^2$) and the effective inside diameter is 0.836 inch and the ratio of jacket length to effective inside diameter is about 141 to 1. Furthermore, under these conditions, the specific flow rate through jacket 11 is between 2.58 LPM/cm$^2$ (liters per minute per square centimeter), obtained by dividing 8 by 3.10, and 2.25 LPM/cm$^2$, obtained by dividing 8 by 3.54.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A thermally reversible heat exchange unit comprising an elongated tubular jacket having a predetermined length and an inner wall of predetermined diameter, said jacket having an inlet at one end and an outlet at the other end, an elongated tubular metal heat transfer surface positioned in the jacket essentially longitudinally of said jacket and substantially equal in length to the length of said jacket, there being a space within the inner wall of said jacket configured to permit a heat exchange liquid to flow between the inner wall of said jacket and said heat transfer surface and wherein the ratio of said length of said jacket to its inside diameter is greater than 50 to 1, whereby to permit a flow of successive portions of miscible heat exchange liquid of differing temperatures between said inlet and said outlet while retaining a substantial difference in temperatures at the interface between successive ones of said liquid portions.

2. A heat exchange unit as in claim 1 further comprising at least one metal tube, and wherein any one of said at least one elongated heat transfer surface is the exterior surface of said at least one metal tube, said tube extending from said jacket in leak proof sealing configuration.

3. A heat exchange unit as in claim 2 wherein said at least one tube is a hydride container made of hydrogen resistant metal.

4. A heat exchange unit as in claim 3 wherein said hydride container contains an essentially coaxial spring defining a central hydrogen gas space and confining metallic hydride former against the tube wall.

5. A heat exchange unit as in claim 1 wherein the ratio of the length of said jacket to its effective inside diameter is at least about 140 to 1.

6. A heat exchange unit as in claim 1 wherein the ratio of the length of said jacket to its effective inside diameter is greater than 140 to 1.

7. A method of using a thermally reversible heat exchange unit comprising an elongated tubular jacket having a predetermined length and an inner wall of predetermined diameter, said jacket having an inlet at one end and an outlet at the other end, an elongated tubular metal heat transfer surface positioned in the jacket essentially longitudinally of the jacket and substantially equal in length to the length of said jacket, there being a space within the inner wall of said jacket, configured to permit a heat exchange liquid to flow between the inner wall of said jacket and said heat transfer surface and wherein the ratio of said length of said jacket to its inside diameter is greater than 50 to 1, said method comprising the steps of continuously forcing heat exchange liquid into said inlet and out said outlet, alternately at a high entering temperature and at a low entering temperature, at a specific flow rate great enough to obtain plug flow of said heat exchange liquid through said jacket.

8. A method as in claim 7 wherein said specific flow rate is greater than 0.5 LPM/cm$^2$.

9. A method as in claim 7 wherein said specific flow rate is at least 2.25 LPM/cm$^2$.

10. A method of using a thermally reversible heat exchange unit comprising an elongated tubular jacket having a predetermined length and an inner wall of predetermined diameter, said jacket having an inlet at one end and an outlet at the other end, an elongated tubular metal heat transfer surface positioned in the jacket essentially longitudinally of the jacket and substantially equal in length to the length of said jacket, there being a space within the inner wall of said jacket configured to permit a heat exchange liquid to flow between the inner wall of said jacket and said heat transfer surface and wherein the ratio of the length of said jacket to its effective inside diameter is at least about 140 to 1, said method comprising the steps of continuously forcing heat exchange liquid into said inlet and out said outlet, alternately at a high entering temperature and at a low entering temperature, at a specific flow rate great enough to obtain plug flow of said heat exchange liquid through said jacket.

11. A method as in claim 10 wherein said specific flow rate is greater than 0.5 LPM/cm$^2$.

12. A method as in claim 10 wherein said specific flow rate is at least 2.25 LPM/cm$^2$.

* * * * *

UNITED STATES PATENT AND TRADEMARK OFFICE
CERTIFICATE OF CORRECTION

PATENT NO. : 4,687,049

DATED : August 18, 1987

INVENTOR(S) : Peter M. Golben

It is certified that error appears in the above–identified patent and that said Letters Patent are hereby corrected as shown below:

```
On the Preamble sheet, in Column 1, Item [63]
   ", abandoned" should be deleted.

In the Specification, Column 1, from Line 6
   ", and now abandoned" should be deleted.
```

Signed and Sealed this

Twenty-second Day of December, 1987

Attest:

DONALD J. QUIGG

Attesting Officer

Commissioner of Patents and Trademarks